Figures 1, 2:
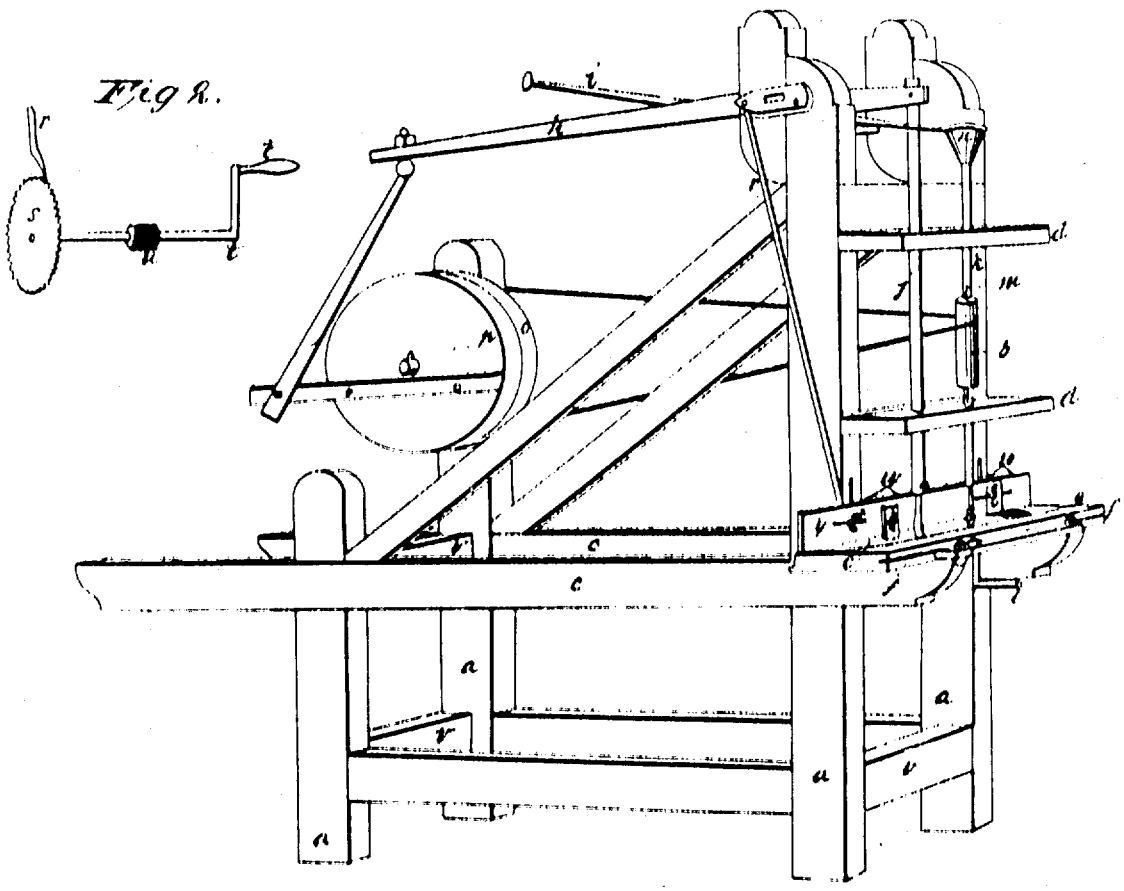

8100X

2 Sheets-Sheet 1.

J. N. Bliss,

Mortising Machine.

Patented Mar. 20, 1834.

2 Sheets-Sheet 2.
8100X
J. N. Bliss,
Mortising Machine.
Patented Mar. 20, 1834.
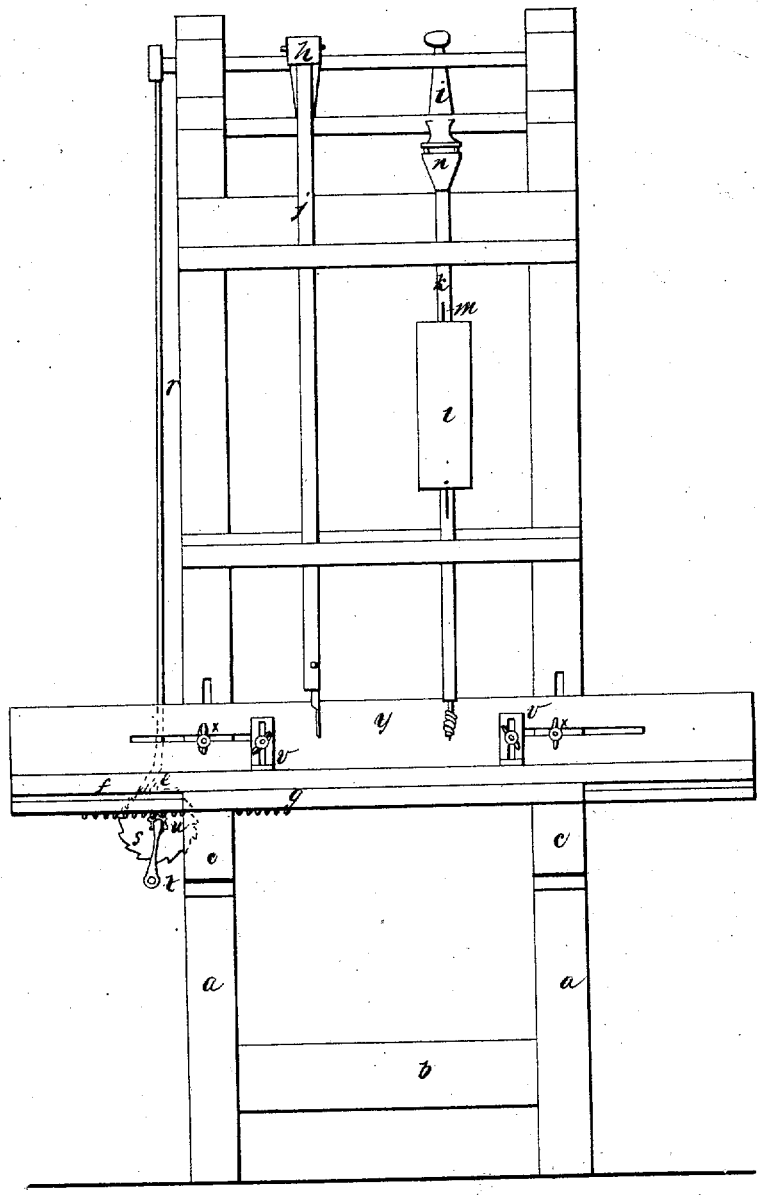
AM. PHOTO-LITHO. CO. N.Y. (OSBORNE'S PROCESS)

Mar. 20. 1834 5[illegible]

Jeremy Wells Bliss, of Somers, Conn.t
Letters Patent

The Schedule referred to in these Letters Patent, and making part of the same containing a description in the words of the said Jeremy Wells Bliss himself, of his improvement in mortising timber by machinery.

---

To all to whom these presents shall come; Be it known that I, Jeremy W. Bliss, of Somers in the County of Tolland in the State of Connecticut have invented, a new and useful improvement and invention in mortising timber by machinery, and that the following is a full and exact description of the construction and operation of the said machine as invented or improved by me — 1st. The frame consists of two perpendicular posts 6 feet in length, 3 by 4 inches, called front or face posts — 2 rear or back posts; the left 4 feet 10 inches long, 4 inches square, the other 3 feet and 1 inch long & 4 inches, square the posts are connected together by girts, 2 long girts 3 feet and 1 inch between joints 3 inches by 2 ; - 3 short girts 12½ inches between joints 3 inches by two connecting the face posts by mortises and tenons - the lower girts enter the posts 6 inches from the bottom; the 2nd tier of girts enter the posts 23½ inches from the bottom - the 3d short girt in front enters the posts 4 feet 10 inches from the bottom; the two rear short girts are 10½ inches long — 2d. Two bed pieces 5 feet 8 inches long 4 inches by three secured to the frame upon the outside, by matching the bed pieces to the posts & with joint bolts, inserted in the tenons of the girts - the bed pieces extend in front of the face posts 9 inches and in rear of the back posts 15 inches & lie at right angles with the upper face of the second tier of short girts. 2 long braces extend from the 2nd tier of short girts in rear to the front posts, directly back of the upper short girt in front, 4 feet 3 inches long 3 by 1½ inches —

3d. In front 2 feet 11 inches above the bed pieces is screwed to the posts a cross piece with 2 perforations, the right square, the left round - 10 inches above the bed pieces in the front posts are two slits to receive and secure by bolts & thumb screws a corresponding cross piece with shoulders, which cross piece is to be raised or depressed by said screws &c, as the work may require —

4th. In front upon the bed pieces, at right angles is placed a moveable

8100X carriage 7 inches wide 3 feet long 2 inches thick, with a lip 1/2 an inch wide to run in a groove cut in the front of the posts to prevent the carriage rising up - the main part of the carriage shouldering against the posts the carriage has a groove in front the whole length, & is secured to the bed pieces, by a cross piece in front, with a lip inserted in the groove & made fast to the bed pieces; by screws & bolts; directly above the carriage & resting thereon is placed a moveable gage to regulate the shoulder of the work of the same length as the carriage 3/4 of an inch thick with keys or wedges affixed to the back of said gauge & having horizontal slits therein & moving parallel with the carriage on bolts secured in the posts by thumb screws —

5th On the back part of the front posts, directly above the braces are affixed and secured by bolts two pieces of wood, one foot long 3 inches square with a hole in each 4 inches from top to receive the tenons of a rail 1 1/4 inch square which passes from piece to piece one through the operating lever, attached to the mortising shaft 8 inches from the end of the lever, 8 inches from the top of said pieces on the back part thereof is affixed, a cross piece 2 inches by 1, with a tenon thereon 3 inches long 1 inch wide and 1/2 an inch thick - and 1 1/2 inch from the inside of the piece attached to the left post, which tenon passes through the lever which raises & depresses the shaft, connected with the spiral bit -

6th A shaft 3 feet 8 inches long 1 1/4 inch square - with a chisel for mortising six inches long, inserted in the end & secured with a screw or wedges, also a round shaft 1 1/4 inch in diameter with a groove 3 1/2 feet in length with a moveable whirl 3 inches in diameter & 7 inches long, with a spur or pin passing to the centre of said whirl and moving in said groove, which can be raised or lowered on the shaft by screws, in the end of said shaft a spiral or concave bit is inserted 6 inches long, and of any required dimensions. 4 inches from the top of the round shaft and thereon is placed a button or washer 2 1/2 inches in diameter & 3 inches long, which may be raised or lowered in the shaft, with a pin or screw, the button or washer having a groove near the upper part in which to receive a lever by which the bit may be raised & depressed while in operation — —

7th A lever with a ball at one end 2 feet 6 inches long with a mortise 9 inches from the other end passing on to the tenon in the cross piece which is flatted at the mortised end & faced with metallic substance, & passes into the groove of the button or washer upon the round shaft by which the shaft can be raised or lowered at pleasure. also a main lever 4 feet 5 inches long 3 1/2 inches wide at one end and 1 1/2 inch at the other & 1 1/2 inch thick, scolloped off at the wide end to two inches in width having a piece bolted on to the right side 1 foot long, which shaft has an opening in the end 1 1/4 inch wide to receive the mortising shaft, the shaft may be shortened or lengthened in the lever, by pins as the work may require — 8th. Twenty inches from the bed piece, upon the inside of the long back post, is inserted an axis 6 inches, in length, upon which is placed one double pulley, one 18 inches in diameter & 2 inches thick the other 11 inches in diameter & 1 1/2 inch thick, also a single pulley 18 inches in diameter 2 1/2 inches thick. 1/2 in inch turned down, upon the outside to receive a shaft 20 inches long inserted in the side of the pulley, half an inch deep & secured with screws which shaft projects from the pulley 2 1/2 inches, to which an arm is attached 21 inches long, 2 inches & 1 inch thick, with a moveable iron joint, connecting the arm to the main shaft, which is secured by a bolt & nut — —

9th. on the end of the square roller, which passes through the main lever, is attached a piece of wood 4 inches long, 2 inches wide & 1 inch thick with an opening to receive an arm 3 ft. 9 inches long 1 inch wide 3/4 of an inch thick, pointed with iron & curved to enter a ratchet or metalic wheel attached to the bed piece — 10th. A cross or metalic ratchet or wheel, 3 inches in diameter, the circumference indented with an iron shaft, with a crank on the end, placed in 2 metallic boxes, attached to the bed piece upon the left side of the frame. upon which iron shaft is a small metallic wheel indented, which runs into a brass or metalic rack, let into & secured to the carriage by screws, by which the carriage is moved — 11th. Two metalic hold fasts, of suitable dimensions, to secure the timber to the carriage, while the machine is in operation — The whole of said machine may be made of wood or metal and may be enlarged or compressed in the whole or its several parts, as best suits convenience or location, & may be operated by steam by water or by hand, or in any mode by which power can be applied — .

Operation. The work is squared for use & secured upon the carriage, the square for the head of the mortise is brought under the bit, the shaft for boring is

[illegible]

put in motion & the head of the mortise is bored the bit is stopped the work is then advanced, so that the chisel may enter the hole the bit is then shifted from the pulley which moves the bit to that which drives the chisel, the machine is put in operation & the mortise cut - the arm is then taken from the wheel & the carriage part run back, by turning the crank by hand & the work made ready for a new operation Witnesses Jeremiah Bliss Walter R. Kibbee Jeremy Wells Bliss Drawing

[1664 words

Exd. [illegible]

(Patent sealed 30th March 1834.)